United States Patent [19]
Shah et al.

[11] Patent Number: 6,041,172
[45] Date of Patent: Mar. 21, 2000

[54] MULTIPLE SCALE SIGNAL PROCESSING AND CONTROL SYSTEM

[75] Inventors: Sunil C. Shah, Mountain View; Pradeep Pandey, San Jose; Mark A. Erickson, Sunnyvale, all of Calif.

[73] Assignee: Voyan Technology, Santa Clara, Calif.

[21] Appl. No.: 08/980,041

[22] Filed: Nov. 26, 1997

[51] Int. Cl.[7] .................................................. G06F 9/455
[52] U.S. Cl. .......................... 395/500.27; 395/500.28; 395/500.23; 700/29; 700/32
[58] Field of Search ........................... 364/578; 392/416; 395/500.23, 500.28; 700/29, 32

[56] References Cited

U.S. PATENT DOCUMENTS

| | | | |
|---|---|---|---|
| 4,577,270 | 3/1986 | Sugano et al. | 364/151 |
| 4,852,018 | 7/1989 | Grossberg et al. | 364/513 |
| 4,881,178 | 11/1989 | Holland et al. | 364/513 |
| 4,974,191 | 11/1990 | Amirghodsi et al. | 364/900 |
| 5,040,214 | 8/1991 | Grossberg et al. | 381/43 |
| 5,060,132 | 10/1991 | Beller et al. | 364/158 |
| 5,191,521 | 3/1993 | Brosilow | 364/160 |
| 5,214,715 | 5/1993 | Carpenter et al. | 382/15 |
| 5,355,305 | 10/1994 | Seem et al. | 364/161 |
| 5,377,307 | 12/1994 | Hoskins et al. | 395/22 |
| 5,412,060 | 5/1995 | Wulff et al. | 528/196 |
| 5,453,226 | 9/1995 | Kline et al. | 264/40.1 |
| 5,464,369 | 11/1995 | Federspiel | 454/256 |
| 5,506,794 | 4/1996 | Lange | 364/571.01 |
| 5,517,594 | 5/1996 | Shah et al. | 392/416 |
| 5,740,033 | 4/1998 | Wassick et al. | 364/149 |
| 5,748,847 | 5/1998 | Lo | 395/23 |
| 5,805,447 | 9/1998 | Teng et al. | 364/157 |

OTHER PUBLICATIONS

PCT International Search Report for PCT/US98/17439 mailed Dec. 29, 1998.
PCT International Search Report for PCT/US98/23889 mailed Apr. 1, 1999.
Rob A. Rutenbar, "Simulated Annealing Algorithms: An Overview", IEEE Circuits and Devices Magazine vol. 5, No. 1, Jan. 1989, pp. 19–26.
N. U. Ahmed et al., "Modified Extended Kalman Filtering" IEEE Transactions on Automatic Control, vol. 39, No. 6, Jun. 1994, pp. 1322–1326.
Brian, D. O. Anderson et al., "Optimal Filtering" Prentice–Hall Information and System Sciences Series, 1997, pp. 1–61, 148, 149, 192–197.
Mozumder, et al, "A Monitor Wafer Based Controller for Semiconductor Processes," IEEE Transactions on Semiconductor Manufacturing, pp. 400–411, Aug. 1994.
Gyugyi et al, "Model–Based Control of Rapid Thermal Processing Systems," First IEEE Conference of Control Applications, pp. 374–381, 1992.
Boning, "Run by Run Control Benchmarking: A White Paper," http://wwww–mtl.mit.edu/rbrBench/white–paper.html (Oct. 1996).

*Primary Examiner*—Kevin J. Teska
*Assistant Examiner*—Samuel Broda
*Attorney, Agent, or Firm*—Blakely, Sokoloff, Taylor & Zafman LLP

[57] ABSTRACT

A method for processing signals and controlling a physical system in which measurements are obtained at different time scales and/or different space scales. Signals generated from the physical system are processed by first creating a first dynamic model at a first time/space scale that consists of a first set of parameters, a first set of states and a first set of inputs. A second dynamic model at a second time/space scale is also created and consists of a second set of parameters, a second set of states and a second set of inputs. At least one of the first set of parameters in the first dynamic model are computed from the second set of states in the second dynamic model. A second estimator is then created to produce estimates of the second set of states using the second dynamic model, measurements from the first physical system at the second time scale. A first estimator is also created to produce estimates of the first set of states using the first dynamic model, measurements from the first physical system at the first time scale, and the estimates from the second estimator.

28 Claims, 7 Drawing Sheets

MULTIPLE SCALE SIGNAL PROCESSING AND CONTROL SYSTEM

FIELD OF THE INVENTION

The present invention relates to the field of signal processing and control systems. More particularly, the invention relates to the use of multiple time scale and/or space scale models for signal processing and control.

BACKGROUND OF THE INVENTION

Signal processing and the control of physical systems generally involves obtaining measurements from a physical system in the form of electrical signals and processing the signals in order to bring about a desired result. For example, the control of a physical system typically involves obtaining measurements from the physical system, comparing the measurements with a predetermined control recipe, and adjusting the system inputs in response to the comparison to minimize variations between the measured values and recipe values. During signal processing and control, the signals to be processed or the variables to be controlled, which ever the case may be, are not always directly available for observation and must be inferred from indirect and noisy measurements. The indirect measurements are generally obtained from embedded sensors which contain multiple pieces of information that are dynamically confounded. Extraction of the information of interest requires the use of complex and time consuming calibration procedures and the use of estimating techniques that result in high computation costs. Equipment setup costs are also high since diagnostic measurements must be taken to correlate the measured signal to the indirect measurements for each piece of equipment.

In addition, measurements from a physical system are not always obtainable at a single time interval (time scale). For example, there may be a first measurement that is obtainable only at a first time scale, a second measurement that is only obtainable at a second time scale, a third measurement that is only obtainable at a third time scale, and so on. In other instances, a measurement, or a set of measurements, taken from a physical system may not bear the same spatial relationship with the system as other measurements taken from the system. Even in instances where all measurements are available at a single high rate, the computation cost of indirect measurements at the high rate can be very high.

Often, the task of controlling a system involves not only the control of a single physical system, but the control of a family of physical systems. This situation is most prevalent in high volume manufacturing applications. The characteristics of a single physical system tend to change over time due to equipment degradation and other causes. Moreover, the characteristics between a family of physical systems tend to differ from one physical system to another due to equipment-to-equipment variations. It is important to track these changes and to account for these differences so that the signal processing or control system may be updated accordingly. Otherwise, the accuracy of the signal processing or control system is compromised.

Current signal processing and control systems do not provide for the rapid calibration of such systems, nor do they have the ability to track changes in the characteristics of a single physical system or a family of physical systems.

Thus, what is needed is an accurate and cost efficient method of processing signals generated within a physical system, or a family of physical systems, in which measurements are obtained at different time scales and/or different space scales.

SUMMARY AND OBJECTS OF THE INVENTION

One object of the present invention is to provide an accurate and cost efficient signal processing or control system.

Another object of the present invention is to provide a method for rapidly calibrating one or more signal processing systems.

Another object of the present invention is to optimize the performance of physical systems in which measurements are be obtained at different time scales.

Another object of the present invention is to optimize the performance of physical systems in which measurements are be obtained at different space scales.

Another object of the present invention is to accurately characterize the behavior of a physical system.

A further object of the present invention is to develop multiple models that characterize the behavior of the physical system at different time scales and to employ online multi-variable control of the physical system based on the multiple time scale models.

Another object of the present invention is to develop multiple models that characterize the behavior of the physical system at different space scales and to employ online multi-variable control of the physical system based on the multiple space scale models.

Another object of the present invention is to control a family of physical systems in which measurements are obtained at different time scales.

Another object of the present invention is to control a family of physical systems in which measurements are obtained at different space scales.

A further object of the present invention is to decrease equipment setup time.

Another object of the present invention is to use diagnostic sensors to improve estimation quality in multi-scale systems.

In one embodiment, these and other objects of the invention are provided by a method for processing signals generated by a physical system in which measurements are available in a first time scale and a second time scale. In accordance with the present invention, signals from the physical system are processed by:

a) creating a first dynamic model at the first time scale that consists of a first set of parameters, a first set of states and a first set of inputs;

b) creating a second dynamic model at the second time scale that consists of a second set of parameters, a second set of states and a second set of inputs, at least one of the first set of parameters in the first dynamic model being computed from the second set of states in the second dynamic model;

c) creating a second estimator to produce estimates of the second set of states using the second dynamic model, measurements from the first physical system at the second time scale; and d) creating a first estimator to produce estimates of the first set of states using the first dynamic model, measurements from the first physical system at the first time scale, and the estimates from the second estimator.

Other objects and features of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

A method for processing signals and controlling a physical system in which measurements from the system are available at two or more time scales, or alternatively, from two or more space scales, is described. In the following description, numerous specific details are set forth in order to provide a thorough understanding of the present invention. It will be obvious, however, to one skilled in the art that these specific details need not be employed to practice the present invention. In other instances, well known methods have not been described in detail in order to avoid unnecessarily obscuring the present invention. Additionally, it should be noted that although the present invention is described in relation to an evaporator deposition system, one with ordinary skill in the art will recognize that such a description is merely illustrative and is not intended to limit the invention. The specific processes and system described herein are only meant to help clarify one's understanding of the present invention and to illustrate particular embodiments in which the present invention may be implemented. It will be appreciated that the broader spirit and scope of the present invention, as set forth in the appended claims, may be applied to any type of process which seeks the achievements attained by the present invention.

Figure 1:
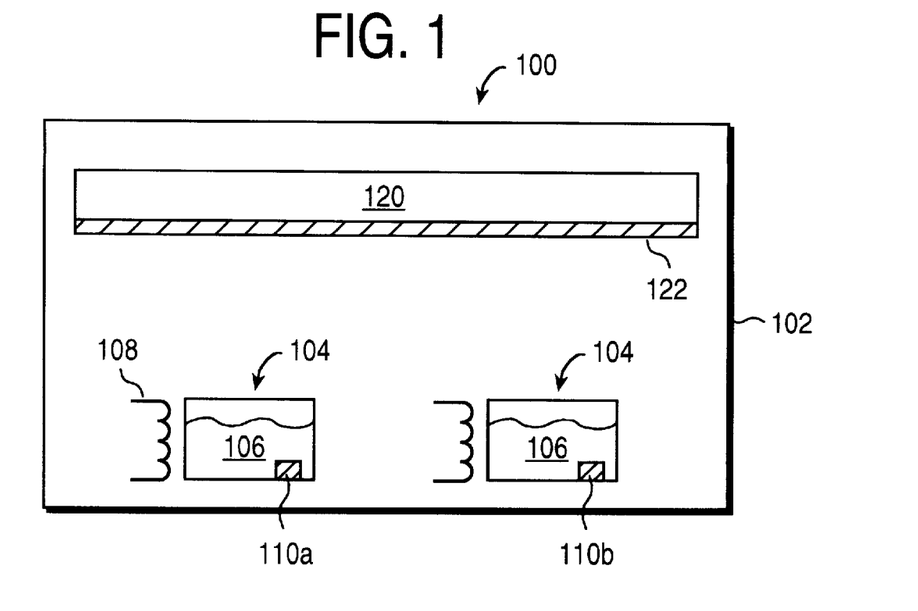
FIG. 1 illustrates an evaporator deposition system.

Referring to the drawings, FIG. 1 illustrates a deposition system 100 comprising a deposition chamber 102 containing a substrate 120 and one or more evaporation sources 104. The evaporation sources include raw materials 106 that are evaporated to produce a film 122 on a surface of substrate 120. Each evaporation source 104 is disposed in thermal exposure to a heating source 108 to evaporate the raw materials to be deposited onto substrate 120. Thermocouples 110 are used to monitor the temperature of the raw materials during the evaporation process. Since the evaporation rate of each raw material is directly related to its temperature, it is important that the pool surface temperature of the raw materials be precisely controlled at the surface of the liquid pool in order to produce a desired film composition on the surface of substrate 120.

It is appreciated that deposition system 100 may be used in a variety of applications to produce particular film compositions on the surface of substrate 120. For example, in one application the deposition system is used to produce photovoltaic cells via a process of thin film deposition. In this process multiple raw materials are evaporated, deposited, and reacted in the deposition chamber 102 to produce a desired film composition 122 on the surface of substrate 120. During the deposition process, the surface temperature of raw material pools 106 are controlled by measuring the temperature of the raw materials at the bottom of the pools with thermocouples 110 at a first time scale (time interval), given by index k, and regulating the power to heaters 108 in response to the temperature measurements.

Once the deposition process is complete, substrate 120 is removed from chamber 100 and the composition of film 122 is measured at a second time scale, given by index j, to determine the product quality. The sample rate of the first time scale given by index k, is faster than the sample rate of the second time scale given by index j.

Figure 2:
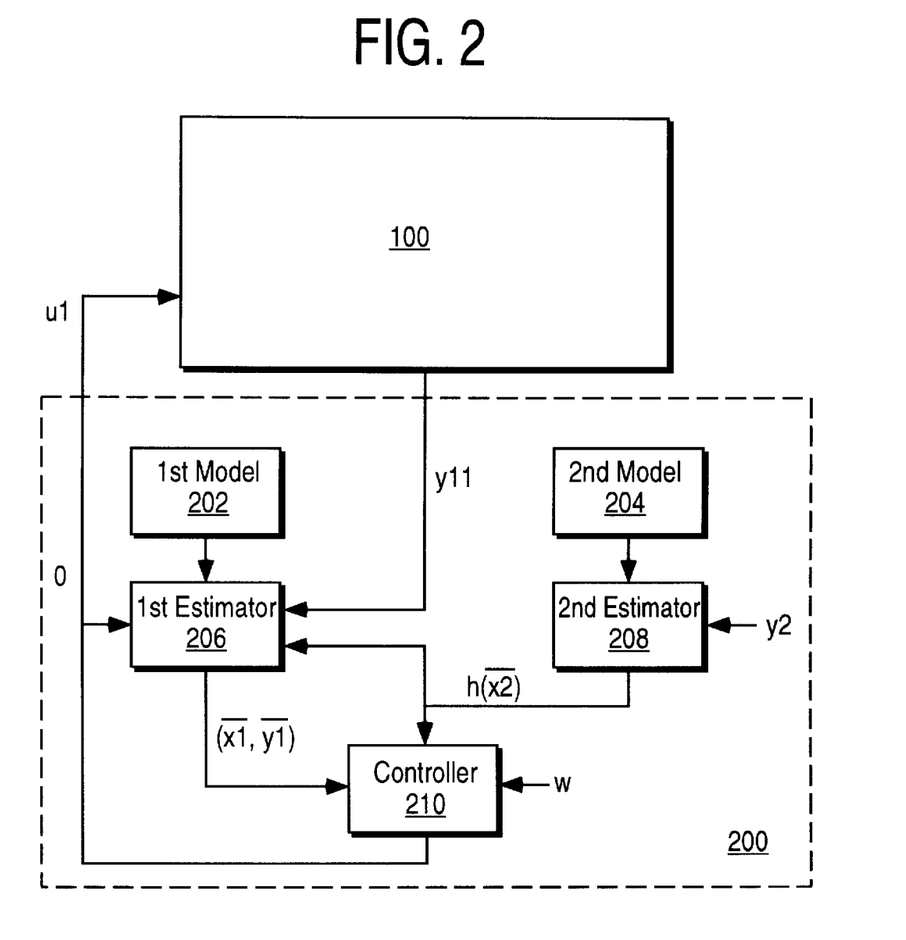
FIG. 2 illustrates a control system for controlling the evaporator deposition system of FIG. 1.

Turning now to FIG. 2, a control system 200 for controlling the deposition system of FIG. 1 is illustrated. The control system uses measurements from both the first and second time scales to create a controller 210 that optimizes the performance of the deposition system in order to produce a desired film composition 122 on the surface of substrate 120 in accordance with a predetermined process recipe or setpoint.

Control system 200 includes a first dynamic model 202 that indicates the behavior of the deposition system 100 at the first time scale index k, and a second dynamic model 204 that indicates the behavior of the deposition system at the second time scale index j. The first dynamic model 202 is represented by the following set of model equations:

$$x1_{k+1} = f_1(x1_k, u1_k, p_{11}, p_{12}), \qquad \text{(Eq. 1)}$$

$$y1_k = g_1(x1_k, u1_k, p_{11}, p_{12}). \qquad \text{(Eq. 2)}$$

where x1 is the thermal and chemical state of the system, u1 is the power input to evaporator heaters 108, y1 are measurements from the system, $p_{11}$ represents fixed system parameters, and $p_{12}$ represents the source evaporation rate parameters for each of the raw materials 106. The evaporation rate parameters, $p_{12}$, may change over time due to physical changes that are occurring within the evaporation chamber. Since the $p_{12}$ parameters are subject to change, it is important that these parameters be updated or refined to ensure that the first dynamic model properly indicates the behavior of the system. The $p_{11}$ parameters may include, for example, the source-to-substrate distance, chamber volume, etc. The y1 measurements consist of two sets of measurements; y11 measurements, and y12 measurements. The y11 measurements are obtained from the evaporator thermocouples 110 (commonly known as production sensors) during the deposition process and represent the temperature of the bottom of raw material pools 106 during the deposition process. The y12 measurements are obtained from diagnostic sensors that are not available during the production process.

The second dynamic model 204 is represented by the following set of model equations:

$$x2_{j+1} = f_2(x2_j, u2_j, p_2), \qquad \text{(Eq. 3)}$$

$$y2_j = g_2(x2_j, u2_j, p_2), \qquad \text{(Eq. 4)}$$

where x2 is the state of the deposition system at the second time scale, u2 are temperature setpoint offsets, $p_2$ are fixed parameters of the system in the second time scale, and y2 is the end-of-run film composition measurements obtained at the end of the deposition process. The $p_{12}$ parameters of the first dynamic model are related to the states x2 of the second dynamic model. That is, $p_{12}=h(x2)$.

In alternative embodiments equation (1) and/or (3) in models 202 and 204 may represent continuous-time dynamic models.

In one instance, the relationship between the $p_{12}$ parameters of the first dynamic model and the states of the second dynamic model (x2) may be characterized in the following manner. The $p_{12}$ parameters are chosen to represent evaporation rate offsets which contribute to variations in the end-of-run film compositions. In such an instance, $p_{12}$ is represented by the following equation:

$$p_{12} = \frac{d}{\alpha} \qquad \text{(Eq. 5)}$$

where d is the true evaporation rate offset (Å) and $\alpha$ is the true thermal sensitivity (Å/° C.). To produce estimates of the $p_{12}$ parameters at the second time scale, the second dynamic model is created using the following set of equations:

$$x2_{j+1} = x2_j + \mu_j, \qquad \text{(Eq. 6)}$$

$$y2_j = d_j + \alpha_j u2_j + v_j, \qquad \text{(Eq. 7)}$$

where $$x2j = \left(\frac{d_j}{\alpha_j}\right),$$

$\mu_j$ a stochastic drift process, $y2_j$ is the measured evaporation offset, $u2_j$ is the temperature setpoint offsets (° C.), and $v_j$ is the measurement noise (Å).

Figure 3:
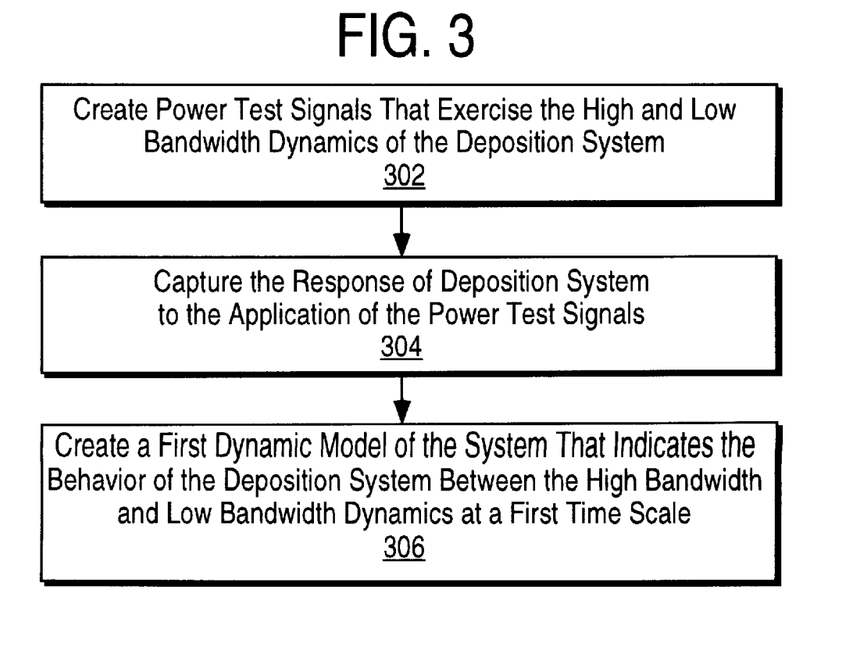
FIG. 3 illustrates a process for designing a dynamic model in one embodiment of the present invention
Figure 4:
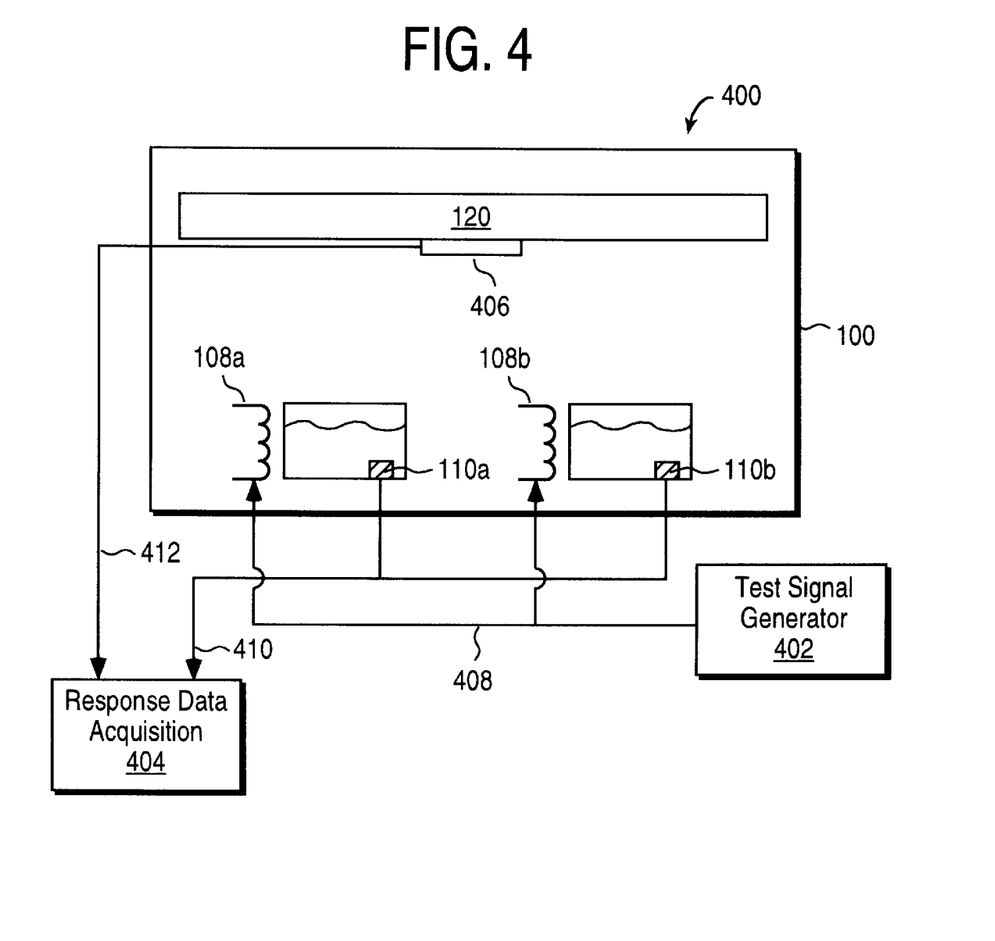
FIG. 4 illustrates the application of power test signals to the system while a synchronous response of the system is gathered.

FIGS. 3 and 4 illustrates a process for designing the first dynamic model 202. At step 302, a set of heater power test signals 408 are created to exercise high bandwidth and low bandwidth dynamics on the system. Test signals 408 are then applied to heaters 108 by a test signal generator 402 to cause the raw materials 106 to evaporate. Diagnostic sensors 406, in the form of a Quartz Crystal Microbalances (QCMs), are positioned within chamber 102 to measure the evaporation rate of the raw materials 106. At step 304, a response data acquisition unit 404 obtains measurement signals 410 and 412 from the diagnostic sensors 406 and thermocouples 110, respectively, in response to the test signals 408. The data acquired during this procedure is used to produce the first dynamic model 202. The first dynamic model 202 indicates the behavior of the system between the high bandwidth and low bandwidth dynamics at the first time scale index k.

As previously discussed, the first dynamic model is represented by both y11 measurements and y12 measurements. During production, the y11 measurements are obtained from thermocouples 110. The y12 measurements (evaporation rates of the raw materials 106), however, are not directly available for observation during the deposition process so that they must be inferred from indirect and noisy measurements. The y11 measurements obtained from thermocouples 110 are also noisy. For this reason, a first estimator 206 is created to produce estimates of the states and measurements of the first model and to predict the raw material evaporation rates (y12 measurements) from the heater powers and thermocouple signals. The end-of-run film composition measurements (y2) are also noisy and for this reason a second estimator 208 is created to provide estimates of the states x2 and measurement inputs y2 of the second dynamic model.

The second estimator 208 is represented by the following set of equations:

$$\overline{x2}_{j+1} = f_{e2}(\overline{x2}_j, u2_j, p_2, y2_j), \qquad \text{(Eq. 8a)}$$

$$\overline{y2}_j = g_{e2}(\overline{x2}_j, u2_j, p_2, y2_j), \qquad \text{(Eq. 9a)}$$

where $\overline{x2}$ represents the state of the estimator and $\overline{y2}$ represents the estimated end-of-run film compositions measurements. In one embodiment, the state of the estimator includes elements of the state error covariance matrix. Equations (5), (6) and (7) express the mathematical relationship of the states x2 and the $p_{12}$ parameters in one embodiment of the invention. In one embodiment, estimator 208 is determined using all $y11_k$ measurements obtained at the first time scale in the last period of the second time scale as shown in equation (10) below. In such an instance, estimator 208 is represented by equations (8b) and (9b) below.

$$\overline{x2}_{j+1} = f_{e2}(\overline{x2}_j, u2_j, p_2, y11_j), \qquad \text{(Eq. 8b)}$$

$$\overline{y2}_j = g_{e2}(\overline{x2}_j, u2_j, p_2, y2_j, y11_j), \qquad \text{(Eq. 9b)}$$

$y11_j$ is represented by:

$$y11_j = \begin{bmatrix} y11_k \\ y11_{k-1} \\ y11_{k-2} \\ \vdots \\ y11_{k-n-1} \end{bmatrix} \qquad \text{(Eq. 10)}$$

where n is the ratio of sample rate 1 to sample rate 2.

In accordance with the present invention, the end-of-run film composition measurements acquired at the second time scale are used to refine the $p_{12}$ parameters of the first dynamic model in the first time scale. The first estimator 206 is, thus, created using the following set of equations:

$$\overline{x1}_{k+1} = f_{e1}(\overline{x1}_k, u1_k, p_{11}, h(\overline{x2}_j), y11_k) \qquad \text{(Eq. 11)}$$

$$\overline{y1}_k = g_{e1}(\overline{x1}_k, u1_k, p_{11}, h(\overline{x2}_j), y11_k) \qquad \text{(Eq. 12)}$$

where $x_{2j}$ is the most recent available update of the second state estimates at time index k.

Construction of the first and second estimators 206 and 208 from models 202 and 204, respectively, are off-line activities.

A controller 210 for controlling the deposition system 100 at the first time scale is then created using the estimates from the first estimator 206 and the second estimator 208. The controller 210 is written as:

$$u1_k = h_1(\overline{x1}_k, p_{11}, h(\overline{x2}_j), \overline{y1}_k, w_k). \qquad \text{(Eq. 13)}$$

where $w_k$ represents a predetermined process recipe or setpoint that will result in a desired film composition being deposited on the surface of substrate 120.

The first and second estimators 206 and 208 may be created based on a variety of filtering techniques. In one embodiment, the first estimator 206 is created by first linearizing equations (1) and (2) to create a set of linear model equations that are represented by:

$$xl_{k+1} = A1xl_k + B1ul_k \quad \text{(Eq. 14)}$$

$$yl_k = C1xl_k + D1ul_k \quad \text{(Eq. 15)}$$

where A1, B1, C1, and D1 represent the linearization of $f_1$ and $g_1$ in equations (1) and (2) and where A1 is of dimension $ns_1 \times ns_1$, B1 is of dimension $ns_1 \times nu_1$, C1 is of dimension $ny_1 \times ns_1$, and D1 is of dimension $ny_1 \times nu_1$. The term A1 is of dimension $ns_1$ is the number of states, $ny_1$ is the number of outputs, and $nu_1$ is the number of inputs in the first dynamic model. In one embodiment $ns_1=30$, $ny_1=20$, and $nu_1=5$.

As before, the output measurement y1 is divided into the measurable and the non-measurable parts as follows:

$$y_k = \begin{bmatrix} y11_k \\ y12_k \end{bmatrix} \quad \text{(Eq. 16)}$$

The vector $y11_k$ corresponds to the measured temperatures from thermocouples 110 and is of dimension $ny_{11} \times 1$. The vector $y12_k$ corresponds to the unmeasured evaporation rates and is of dimension $ny_{12} \times 1$. In one embodiment $ny_{11}=10$ and $ny_{12}=10$.

Correspondingly, the output matrix C is partitioned as $$C1 = \begin{bmatrix} C_{11} \\ C_{12} \end{bmatrix} \quad \text{(Eq. 17)}$$

where the matrix $C_{11}$ is of dimension $ny_{11} \times ns_1$ and the matrix $C_{12}$ is of dimension $ny_{12} \times ns_1$. A time-invariant Kalman filter is then obtained by solving the following steady state Riccati equation $$A1^T X A1 - X - A1^T X C_{11}(Q_v + C_{11} X C_{11})^{-1} Q_2 = 0 \quad \text{(Eq.18)}$$

where $Q_w$ is the process noise covariance and $Q_v$ is the measurement noise covariance.

From the Riccati solution, X, the Kalman filter gain matrix is given by, $L = X C_{11}^T (Q_v + C_{11} X C_{11}^T)^{-1}$ and the Kalman filter equations are given by equations (18) and (19) below.

$$\overline{xl}_{k+1} = A1\overline{xl}_k + B1ul_k + L(y11_k - C_{11}\overline{xl}_k) \quad \text{(Eq. 19)}$$

$$\overline{yl}_k = C1\overline{xl}_k \quad \text{(Eq. 20)}$$

In another embodiment, multiple linearized models are obtained each with index i for different steady-state operating pints and the gain matrices $L_i$ are obtained by solving steady-state Riccati equations using reduced order ARX model parameters as disclosed in column 8, line 22 through column 9, line 22 of U.S. Pat. No. 5,517,594. U.S. Pat. No. 5,517,594 entitled "Thermal Reactor Optimization" is hereby incorporated by reference.

It is appreciated that the present invention is not limited to the manner in which the first or second estimators are created. For example, estimators 206 and 208 may be created using a continuous-time extended Kalman filter (CTEKF) for state estimations in cases where equations (1) and/or (3) are continuous-time dynamic models, and in some instances may also be based on the diagnostic measurements, y12. The estimators may also be created using other filtering techniques such as a discrete-time extended Kalman filter (DTEKF) for state estimation. In one embodiment, the first estimator 206 is based on an extended Kalman filter (EKF) that uses discrete time measurements and integration. This method is described in co-pending United States patent application entitled "A Method for Real-Time Nonlinear System State Estimation and Control", filed by Sunil C. Shah and Pradeep Pandey on Aug. 22, 1997 and hereby incorporated by reference.

Although the discussion has thus been limited to controlling an evaporator deposition system, it is to be understood that the present invention is not limited to a specific type of system to be controlled, nor is it limited to a specific type of control system. In addition, it is appreciated that the present invention is not limited to a method of controlling a physical system that is characterized by only two time scales. Moreover, it is important to note that the scope of the present invention is not limited to control systems, but is also applicable to the field of signal processing in general.

Figure 5:
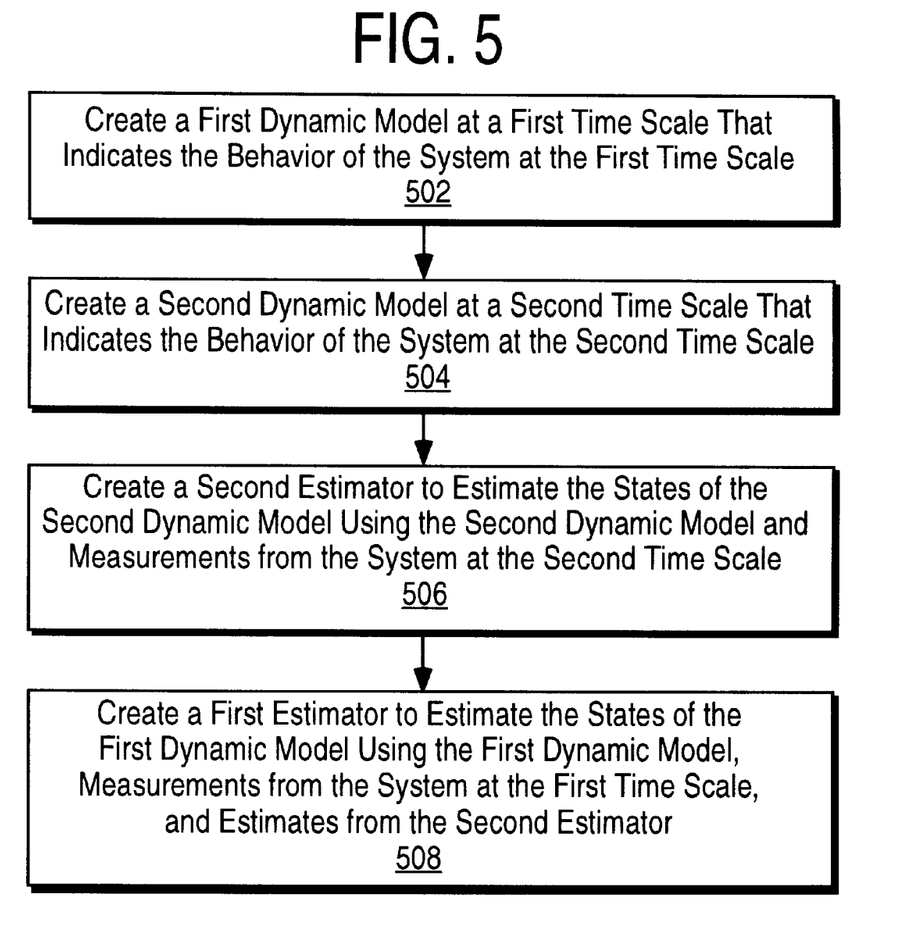
FIG. 5 is a flow chart of a method for processing signals from a physical system in accordance with one embodiment of the present invention.

In accordance with the present invention, signals generated from any physical system may be processed pursuant to the method outlined in the flow chart of FIG. 5. In step 502, a first dynamic model is created that indicates a behavior of the physical system at a first time scale. In step 504, a second dynamic model is created that indicates a behavior of the physical system at a second time scale. In step 506, a second estimator is created to estimate the states of the second dynamic model using the second dynamic model and measurements from the physical system at the second time scale. In step 508, a first estimator is created to estimate the states of the first dynamic model using the first dynamic model, measurements from the physical system at the first time scale, and estimates from the second estimator.

By processing the signals from the physical system in the manner outlined in FIG. 5, a controller for controlling the physical system at the first time scale may be created using estimates from the first and second estimators. Equations (1) through (4), (8), (9) and (11) through (13) generally represent the manner in which the dynamic models, estimators and controller are constructed in one embodiment of the invention.

By decomposing the signal processing and control problem into a series of problems, the number of operations required to solve the problem is reduced compared to estimating all parameters at the same time scale. In the example above, the deposition system is defined by a first set of parameters (fast parameters) that is changing at a fast rate and a second set of parameters (slow parameters) that is changing at a slow rate. The number of calculations required per time period to solve the combined set of parameters at a single fast time scale is represented by $k(ns_1+ns_2)^3$, where $ns_1$ is the number of states of the first model and $ns_2$ is the number of states in the second model. By decomposing the problem into two separate problems, the number of calculations required per time period to solve the parameters is represented by the $kns_1^3 + kns_2^3$. Therefore, if $ns_1=ns_2$ the number of operations required to solve the first and second set of parameters is reduced by a factor of four. The number of calculations is also reduced by the fact that the slow parameters are updated at a slower rate than the fast parameters. Therefore, instead of updating all of the parameters of the system at the fast time scale, the parameters are divided among different time scales and updated accordingly. By updating the slow parameters at a slower rate than the fast parameters, the number of calculations required to solve the signal processing or control problem is reduced. The benefits of the present invention become even more pronounced in systems containing more than two sets of parameters that are changing or being updated at different rates.

In the foregoing discussion, a method for controlling a single deposition system has been described wherein measurements are obtained from the system at multiple times scales. These measurements are then used in the manner previously described to create a controller for controlling the performance of the single deposition system.

The high volume requirements of most manufacturing applications, however, require the use of multiple systems in order to meet production quotas. This typically includes using a family of "identical" systems that are controlled using a common control scheme. For example, in lieu of using a single deposition chamber to produce photovoltaic devices on the surfaces of substrates, it would be common to employ a family of deposition chambers in order to increase the production of the devices. In theory, each deposition chamber within the family of chambers is manufactured so that all the chambers are identical. In reality, however, chambers-to-chamber variations will exist. For example, the thermal characteristics of each of the chambers within the family may vary due to differences in the heater elements, insulation properties, emissivity variations, etc.

Figure 6:
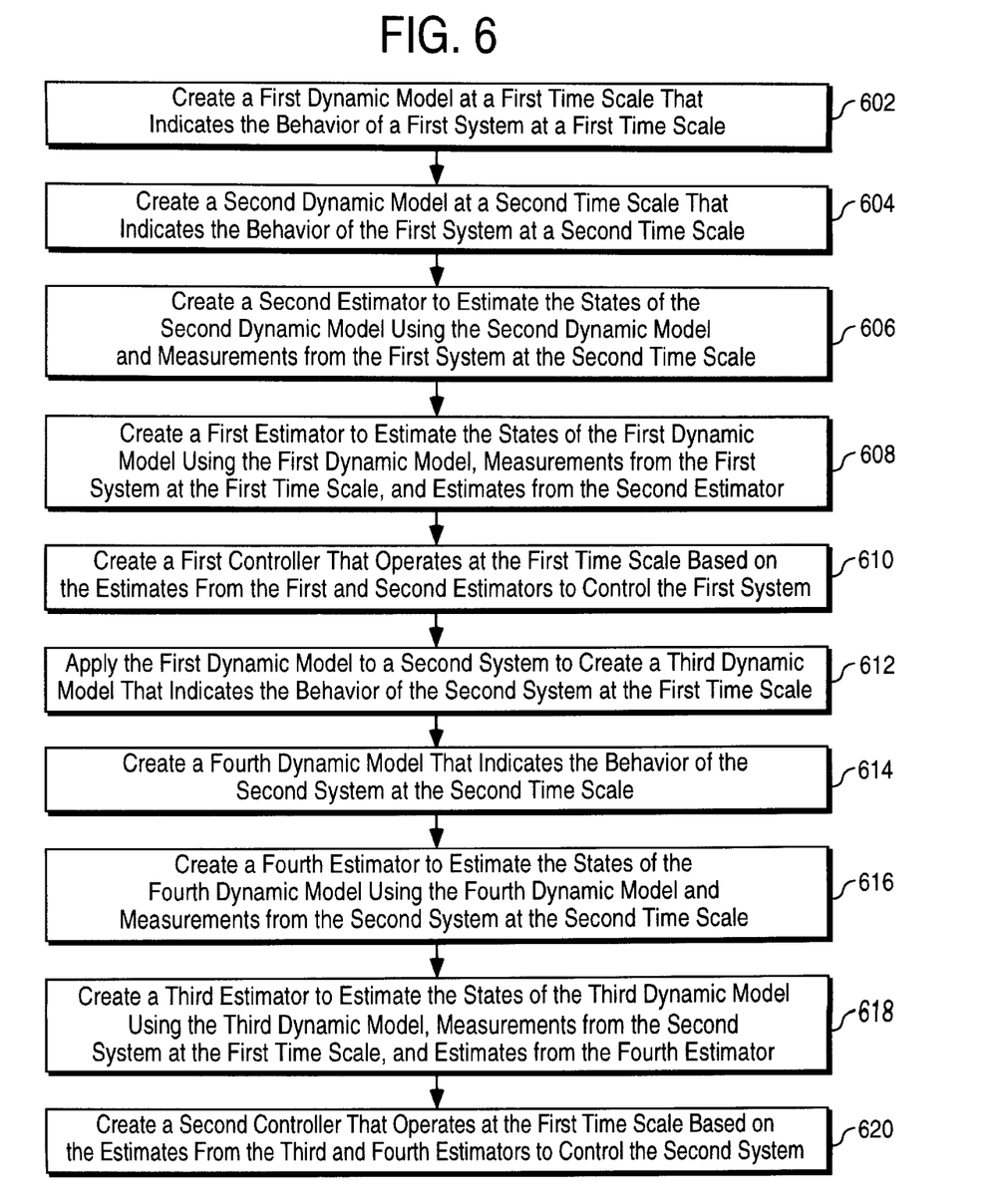
FIG. 6 is a flow chart of a method for controlling a family physical systems.

The present invention provides a method for controlling two or more systems within a family of systems which accounts for the differences between each of the systems. FIG. 6 is a flow chart that outlines a method for controlling a family of systems consisting of a first system and a second system. In step 602, a first dynamic model is created at a first time scale that indicates the behavior of the first system at the first time scale. This typically involves exciting the first system and capturing the response of the first system in a manner similar to that described above in FIGS. 3 and 4. The first dynamic model is represented by equations (1) and (2) above, wherein the $p_{12}$ parameters capture equipment-to-equipment variations between the first system and the second system.

In step 604, a second dynamic model is created at a second time scale that indicates the behavior of the of the first system at the second time scale. The second dynamic model is represented by equations (3) and (4) above.

In steps 604, 606, and 608, a first estimator, second estimator, and first controller are created in a manner similar to that described in the example above. Accordingly, equations (8) through (12) may be used to represent the first estimator, second estimator, and first controller for the first system.

A second controller for optimizing the performance of the second system is then created by applying the first dynamic model to the second system to create a third dynamic model. (Step 612) The third dynamic model indicates the behavior of the second system at the first time scale and is represented by the following set of model equations:

$$x3_{k+1} = f_1(x3_k, u3_k, p_{11}, p_{32}), \quad \text{(Eq. 21)}$$

$$y3_k = g_1(x3_k, u3_k, p_{11}, p_{32}). \quad \text{(Eq. 22)}$$

where x3 is the state of the second system, u3 are inputs to the second system, y3 are measurements from the second system, $p_{11}$ represents fixed parameters, and $p_{32}$ represents refinable parameters, including those parameters that represent equipment variations between the first and second systems.

In step 614, a fourth dynamic model is created to indicate the behavior of the second system at the second time scale and is represented by the following set of model equations:

$$x4_{j+1} = f_2(x4_j, u4_j, p_4), \quad \text{(Eq. 23)}$$

$$y4_j = g_2(x4_j, u4_j, p_4), \quad \text{(Eq. 24)}$$

where x4 is the state of the second system at the second time scale, u4 inputs to the second system, $p_4$ are fixed parameters of the second system at the second time scale, and y4 are measurements of the second system at the second time scale. The $p_{32}$ parameters of the third dynamic model are related to the states x4 of the fourth dynamic model. That is, $p_{32}=h(x4)$.

In step 616, a fourth estimator is created to estimate the states of the fourth dynamic model. The fourth estimator is created using the fourth dynamic model and measurements from the second system at the second time scale. In some instances, measurements from the second system at the first time scale are additionally used to create the fourth estimator. The fourth estimator may then be represented by the following set of equations.

$$\overline{x4}_{j+1} = f_{e2}(\overline{x4}_j, u4_j, p_4, y4_j), \quad \text{(Eq. 25)}$$

$$\overline{y4}_j = g_{e2}(\overline{x4}_j, u4_j, p_4, y4_j), \quad \text{(Eq. 26)}$$

In step 618, a third estimator is created to estimate the states of the third dynamic model. The third estimator is created using the third dynamic model, measurements from the second system at the first time scale and the estimates from the fourth estimator and is represented by equations (26) and (27) below.

$$\overline{x3}_{k+1} = f_{e1}(\overline{x3}_k, u3_k, p_{31}, h(\overline{x4}_j), y3I_k) \quad \text{(Eq. 27)}$$

$$\overline{y3}_k = g_{e1}(\overline{x3}_k, u3_k, p_{31}, h(\overline{x4}_j), y3I_k) \quad \text{(Eq. 28)}$$

In step 620, a second controller for controlling the second system at the first time scale is created using estimates from the third and fourth estimators. The second controller maybe written as:

$$u3_k = h_1(\overline{x3}_k, p_{31}, h(\overline{x4}_j), \overline{y3}_k, w_k) \quad \text{(Eq. 29)}$$

In one embodiment, the first dynamic model of the first system is applied to the second system in order to create the third dynamic model after it is initially created. In an alternative embodiment, the first dynamic model is first refined by implementing steps 602 through 610 before it is applied to the second system to create the third dynamic model. The ability to apply the first dynamic model of the first system to other systems alleviates the need to obtain diagnostic measurements from these systems during setup. As a result, the setup time and the costs associated with setting up each system is therefore reduced.

The foregoing examples have been limited to manufacturing applications. It is appreciated, however, that the present invention is not limited to such applications, nor is it limited to control systems. The present invention may also be applied to signal processing in general. For example, in the field of magnetic disk drives read-write signal processing is required. Typically, a magnetic disk drive consist of a stack of circular disks having a thin magnetic coating rotating at high speed. Data is recorded on the disk surfaces using transducers mounted on read-write heads. The read-write heads are attached to actuator arms that are moved across the disk surfaces by a high-speed actuators that are under the control of a servo motor. The actual information is recorded in circumferential tracks on the disk surfaces. Reading the recorded information back involves sensing the magnetic transitions emanating from the surfaces of the magnetic disks, again using the transducers.

The ability to store and read back information from each of the magnetic disks is affected by vibrations in the arm assemblies which affect the position of the read-write head transducers within the circumferential tracks. Magnetic modulation of the thin magnetic coatings will also affect the signal that is produced by the read-write head transducers. The read-write head transducer signals will thus consist of confounded information that is representative by both the vibration and magnetic modulation.

Variations also exists between each of the read-write heads. These variations may be in the form of different read-write head transducer sensitivities, differences in the physical characteristics of the read-write heads, nominal tolerance differences, etc.

In accordance with the present invention, the read-write signals may be processed by first creating a first model at a first time scale that indicates and takes into account the vibrational and magnetic modulation components of the magnetic disk drive. The first model may be represented by the following set of model equations:

$$x1_{k+1} = f_1(x1_k, u1_k, p_{11}, p_{12}),\quad\text{(Eq. 30)}$$

$$y1_k = g_1(x1_k, u1_k, p_{11}, p_{12}).\quad\text{(Eq. 31)}$$

where x1 is the position and magnetic states of the system, u1 is servo motor commands, y1 are measurements from taken from magnetic disk drive unit, $p_{11}$ represents fixed system parameters, and $p_{12}$ represents head mass, offset and film sensitivity parameters. The $p_{12}$ parameters are subject to change and/or may vary from one magnetic disk/head assembly to another. Therefore, it is important that these parameters be updated or refined to ensure that the first model properly indicates the behavior of the disk drive unit. The $p_{11}$ parameters may include dynamics parameters, such as drag and inertia parameters. The y1 measurements consist of two sets of measurements; y11 measurements, and y12 measurements. The y11 measurements include servo motor drive current, the read-write head sensor signal, actuator arm position, and servo motor velocity. The y12 measurements may include read-write head positioning measurements that are obtained with laser positioning diagnostic sensors.

A second model at a second time scale is also created which indicates how each of the read-write heads, servo motor parameters, structural vibration parameters, friction and drag parameters change over time and from component to component. The second model also indicates how measurements of previously recorded data changes with drive and component parameters x2. The second model equations may be written as:

$$x2_{j+1} = f_2(x2_j, u2_j, p_2),\quad\text{(Eq. 32)}$$

$$y2_j = g_2(x2_j, u2_j, p_2),\quad\text{(Eq. 33)}$$

where x2 comprise head mass and transducer sensitivity states of the system, u2 is the head position setpoint offsets, $p_2$ are fixed parameters of the magnetic disk drive in the second time scale, and y2 is the measurement of previously recorded data. The $p_{12}$ parameters of the first model are related to the states x2 of the second dynamic model. That is, $p_{12}=h(x2)$.

Thus, in accordance with the present invention, read-write signal processing is achieved by decomposing the magnetic disk drive into two separate models and updating the models in accordance with the method of FIG. 5.

Figure 7A:
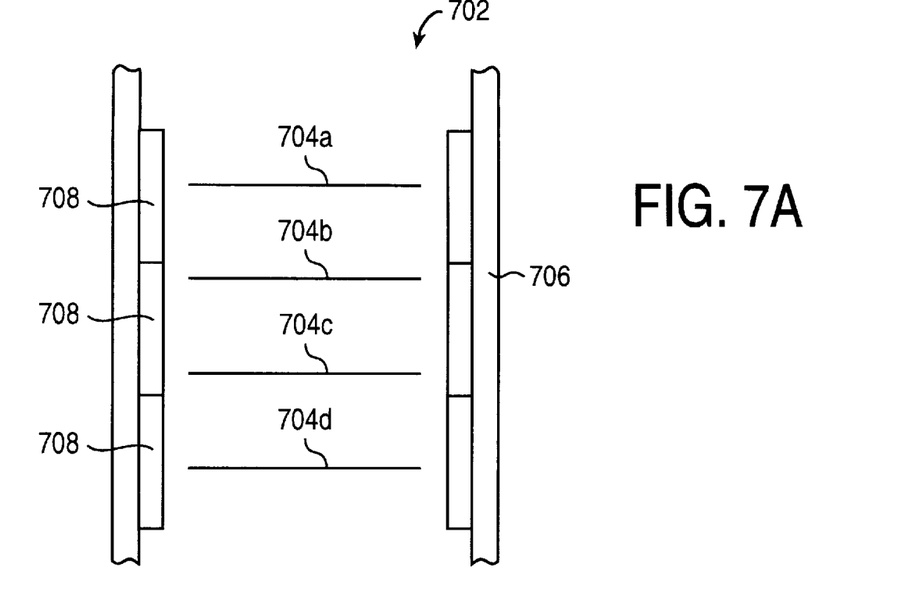
FIG. 7A illustrates a side view of a conventional wafer processing furnace.

As previously discussed, the methods of the present invention are applicable to systems that are characterized by different space scales. FIG. 7A exemplifies such a system. In FIG. 7A, a furnace 702 for processing a plurality of wafers 704a–704d is shown. The furnace 702 includes a quartz jar 706 having a set of heating elements 708 that surround the quartz jar. During processing of the wafers 704a–704d, it is necessary to control the temperature of the wafers in order to achieve a certain degree of process uniformity.

A furnace controller may be created to control the temperature of the wafers by first determining a first dynamic model at a fine space scale given by index 1, that consists of a first set of parameters, a first set of states, and a first set of inputs. The first dynamic model at the fine space scale may be written as:

$$x1_{l+1} = f_1(x1_l, u1_l, p_{11}, p_{12}),\quad\text{(Eq. 34)}$$

$$y1_l = g_1(x1_l, u1_l, p_{11}, p_{12}).\quad\text{(Eq. 35)}$$

Figure 7B:
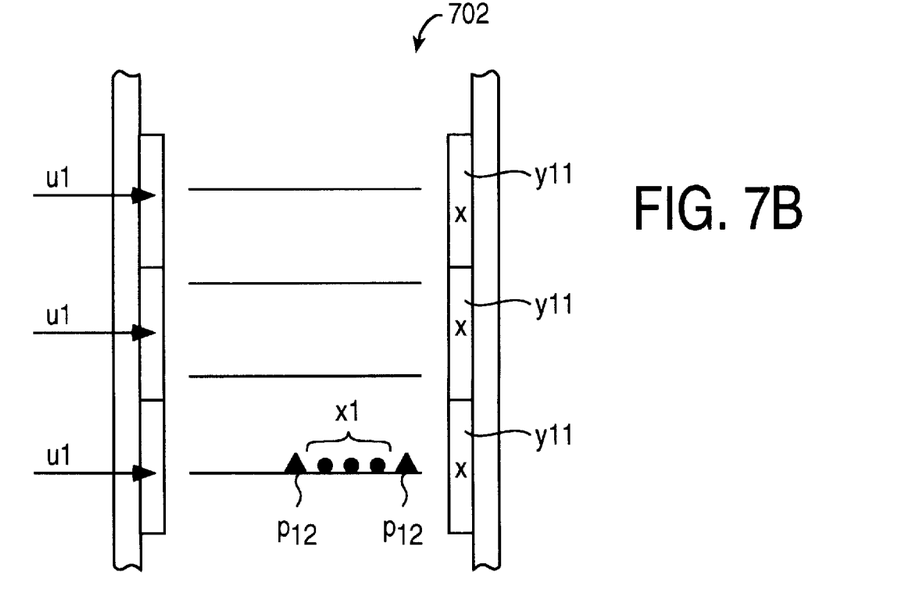
FIG. 7B illustrates a fine scale model of the furnace shown in FIG. 7A.

As illustrated in FIG. 7b, x1 comprises wafer 704d temperatures, u1 is the heater powers, y1 are temperature measurements taken from the system, $p_{11}$ is the thermal dynamics of the system, and $p_{12}$ represents the center and edge temperatures of wafer 704d. The y1 measurements consist of two sets of measurements; y11 measurements, and y12 measurements. The y11 measurements are obtained from production thermocouples within the furnace, whereas the y12 measurements are obtained from diagnostic sensors that are not available during the production process.

Figure 7C:
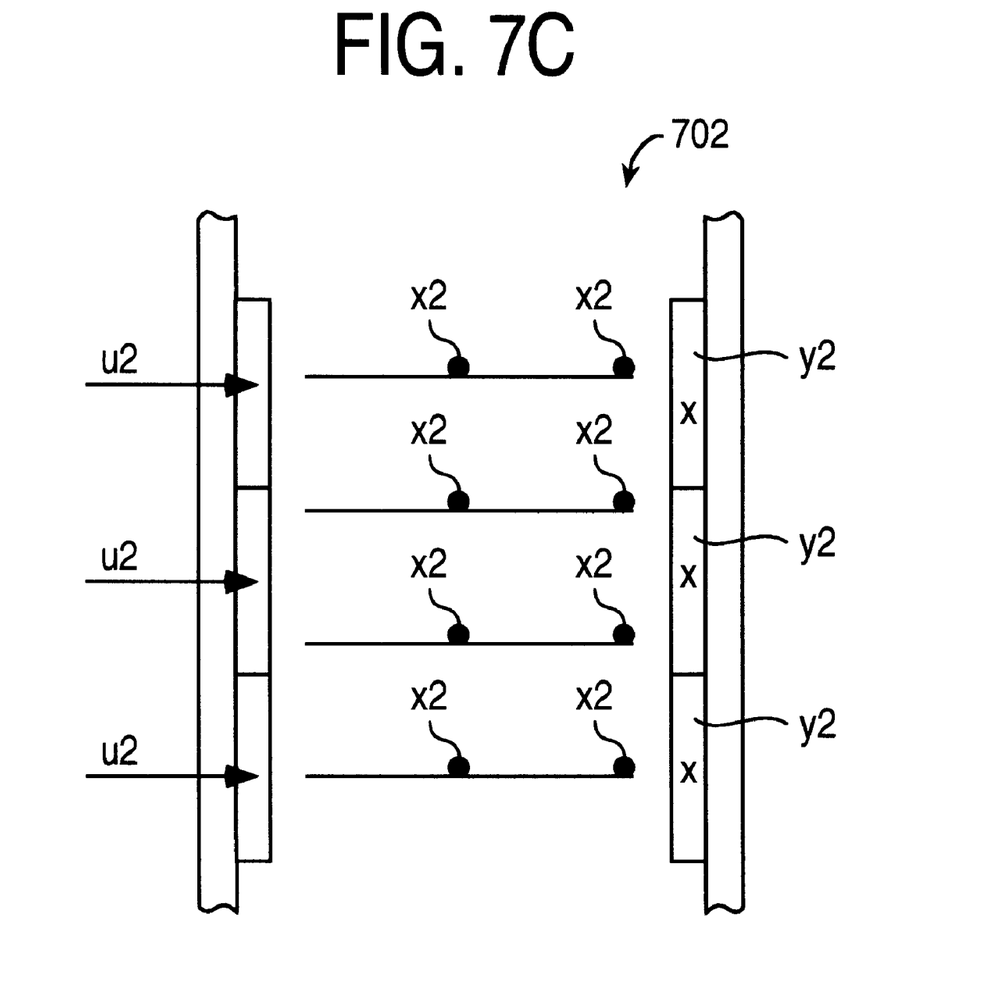
FIG. 7C illustrates a coarse scale model of the furnace shown in FIG. 7A.

A second dynamic model at a coarse space scale given by index m, is also created and consists of a second set of parameters, a second set of states, and a second set of inputs. The second dynamic model may be represented by the following equations:

$$x2_{m+1} = f_2(x2_m, u2_m, p_2),\quad\text{(Eq. 36)}$$

$$y2_m = g_2(x2_m, u2_m, p_2),\quad\text{(Eq. 37)}$$

As illustrated in FIG. 7C, x2 is the center and edge temperatures of wafers 704a–704d, u2 is the heater powers, $p_2$ represents the dynamics of the system at the coarse space scale, and y2 represents furnace production sensor measurements.

A second estimator of the coarse model is created using the following set of equations:

$$\overline{x2}_{m+1} = f_{e2}(\overline{x2}_m, u2_m, p_2, y2_m),\quad\text{(Eq. 38a)}$$

$$\overline{y2}_m = g_{e2}(\overline{x2}_m, u2_m, p_2, y2_m).\quad\text{(Eq. 39a)}$$

where $\overline{x2}$ represents estimates of the wafer center and edge temperatures and $\overline{y2}$ represents estimates of the production thermocouple measurements.

In accordance with the present invention, the center and edge wafer temperatures at the coarse space scale are used to refine the $p_{12}$ parameters of the first dynamic model in the fine space scale. A first estimator of the fine model is, thus, created using equations (40) and (41) below.

$$\overline{x1}_{l+1} = f_{el}(\overline{x1}_l, p_{11}, h(\overline{x2}_m), y11_1) \qquad \text{(Eq. 40)}$$

$$\overline{y1}_l = g_{el}(\overline{x1}_l, u1_l, p_{11}, h(\overline{x2}_m), y11_1) \qquad \text{(Eq. 41)}$$

A controller for controlling the furnace 702 at the fine space scale is created using the estimates from the first estimator and the second estimator. The controller is written as:

$$u1_l = h_1(\overline{x1}_l, p_{11}, h(\overline{x2}_m), \overline{y1}_l, w_l). \qquad \text{(Eq. 42)}$$

where w represents a predetermined process recipe or setpoint.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method of processing signals generated from a first physical system comprising the steps of:
   a) creating a first dynamic model of the first physical system, the first dynamic model being created at a first time scale that consists of a first set of parameters, a first set of states and a first set of inputs;
   b) creating a second dynamic model of the first physical system, the second dynamic model being created at a second time scale that consists of a second set of parameters, a second set of states and a second set of inputs, at least one of the first set of parameters in the first dynamic model being computed from the second set of states in the second dynamic model;
   c) creating a second estimator to produce estimates of the second set of states using the second dynamic model, measurements from the first physical system at the second time scale; and
   d) creating a first estimator to produce estimates of the first set of states using the first dynamic model, measurements from the first physical system at the first time scale, and the estimates from the second estimator.

2. The method of claim 1 wherein the step of creating the second estimator is performed by further using measurements from the first physical system at the first time scale.

3. The method of claim 1 wherein the first set of parameters comprises a first subset of parameters that are constant and a second subset of parameters that vary with time, the second subset of parameters computed from the second set of states in the second model.

4. The method of claim 1 wherein the first dynamic model is created using diagnostic sensors.

5. The method of claim 1, wherein the step of creating the first dynamic model comprises the steps of:
   creating a set of test signals that exercise high bandwidth and low bandwidth dynamics of the first physical system;
   applying the test signals to the first physical system while capturing a synchronous response of the first physical system to the test signals, the first dynamic model correlating the test signals and synchronous response of the first physical system.

6. The method of claim 1 wherein at least one of the estimators is based on linearized models at multiple operating points.

7. The method of claim 1 wherein at least one of the estimators is based on a continuous-time extended Kalman filter (CTEKF) for state estimation.

8. The method of claim 1 wherein at least one of the estimators is based on a continuous-time extended Kalman filter (CTEKF) for state estimation and the diagnostic measurements.

9. The method of claim 1 wherein at least one of the estimators is based on a discrete-time extended Kalman filter (DTEKF) for state estimation.

10. The method of claim 1 further comprising the step of processing signals generated from a second physical system which comprises the steps of
    a) applying the first dynamic model to the second physical system to create a third dynamic model at the first time scale that represents the behavior of the second physical system, the third dynamic model consisting of a third set of parameters, a first set of states and a first set of inputs;
    b) creating a fourth dynamic model at the second time scale that consists of a fourth set of parameters, a fourth set of states and a fourth set of inputs, at least one of the third set of parameters in the third dynamic model being computed from the fourth set of states in the fourth dynamic model;
    c) creating a fourth estimator to produce estimates of the fourth set of states using the fourth dynamic model and measurements from the second physical system at the second time scale; and
    d) creating a third estimator to produce estimates of the third set of states using the third dynamic model, measurements from the second physical system at the first time scale, and the estimates from the fourth estimator; and
    d) creating a second controller that operates at the first time scale based on the estimates from the third and fourth estimators, the controller optimizing the performance of the second physical system.

11. The method of claim 10 wherein the step of creating the fourth estimator is performed by further using measurements from the second physical system at the first time scale.

12. A method for controlling a second physical system in a family of physical systems that includes a first physical system and the second physical system, the method comprising the steps of:
    a) creating a first dynamic model at a first time scale that indicates the behavior of the first physical system, wherein the first dynamic model consists of a first set of states, a first set of inputs, and a first set of parameters, the first set of parameters comprising a first subset of parameters and a second subset of parameters, the first subset of parameters being common to the first and second physical systems;
    b) creating a second dynamic model at a second time scale that indicates the behavior of the first physical system at the second time scale, wherein the second dynamic model consists of a second set of parameters, a second set of states and a second set of inputs, the second subset of parameters in the first dynamic model being computed from the second set of states in the second model;
    c) creating a second estimator to produce estimates of the second set of states using the second dynamic model and measurements from the second physical system at the second time scale;
    d) creating a first estimator to produce estimates of the first set of states using the first dynamic model, measurements from the first physical system at the first time scale, and the estimates from the second estimator;

e) creating a controller that operates at the first time scale based on the estimates from the first and second estimators, the controller optimizing the performance of the second physical system;

f) applying the first dynamic model to the second physical system to create a third dynamic model at the first time scale that represents the behavior of the second physical system, the third dynamic model consisting of a third set of states, a third set of inputs, and a third set of parameters, the third set of parameters comprising the first subset of parameters and a third subset of parameters;

g) creating a fourth dynamic model at the second time scale that consists of a fourth set of parameters, a fourth set of states and a fourth set of inputs, the third subset of parameters in the third dynamic model being computed from the fourth set of states in the fourth dynamic model;

h) creating a fourth estimator to produce estimates of the fourth set of states using the fourth dynamic model, measurements from the second physical system at the second time scale;

i) creating a third estimator to produce estimates of the third set of states using the third dynamic model, measurements from the second physical system at the first time scale, and the estimates from the fourth estimator; and j) creating a second controller that operates at the first time scale based on the estimates from the third and fourth estimators, the controller optimizing the performance of the second physical system.

13. The method of claim 12 wherein the step of creating the second estimator is performed by further using measurements from the first physical system at the first time scale.

14. The method of claim 12 wherein the step of creating the fourth estimator is performed by further using measurements from the second physical system at the first time scale.

15. The method of claim 12, wherein the step of creating the first dynamic model comprises the steps of:

creating a set of test signals that exercise high bandwidth and low bandwidth dynamics of the first physical system;

applying the test signals to the first physical system while capturing a synchronous response of the first physical system to the test signals, the first dynamic model correlating the test signals and synonous response of the first physical system.

16. The method of claim 15, wherein the step of capturing a synchronous response of the first physical system comprises the steps of capturing a series of measurements through a set of diagnostic sensors in the first physical system.

17. The method of claim 15, wherein the step of capturing a synchronous response of the first physical system comprises the steps of capturing a series of measurements through a set of production sensors and a set of diagnostic sensors in the first physical system.

18. The method of claim 12, wherein each first and second physical system comprises an evaporation chamber and a deposition target.

19. The method of claim 12 wherein at least one of the estimators is based on linearized models at multiple operating points.

20. The method of claim 12 wherein at least one of the estimators is based on a continuous-time extended Kalman filter (CTEKF) for state estimation.

21. The method of claim 12 wherein at least one of the estimators is based on a continuous-time extended Kalman filter (CTEKF) for state estimation and the diagnostic measurements.

22. The method of claim 12 wherein at least one of the estimators is based on a discrete-time extended Kalman filter (DTEKF) for state estimation.

23. A method of processing signals generated from a physical system comprising the steps of:

a) creating a first dynamic model of the physical system, the first dynamic model being created in a first space scale that consists of a first set of parameters, a first set of states and a first set of inputs;

b) creating a second dynamic model of the physical system, the second dynamic model being created in a second space scale that consists of a second set of parameters, a second set of states and a second set of inputs, at least one of the first set of parameters in the first dynamic model being computed from the second set of states in the second dynamic model;

c) creating a second estimator to produce estimates of the second set of states using the second dynamic model, measurements from the physical system in the second space scale; and d) creating a first estimator to produce estimates of the first set of states using the first dynamic model, measurements from the physical system in the first space scale, and the estimates from the second estimator;

e) creating a controller that operates in the first space scale based on the estimates from the first and second estimators, the controller optimizing the behavior of the physical system.

24. The method of claim 23 wherein the first dynamic model is created using diagnostic sensors.

25. The method of claim 23 wherein at least one of the estimators is based on linearized models at multiple operating points.

26. The method of claim 23 wherein at least one of the estimators is based on a continuous-time extended Kalman filter (CTEKF) for state estimation.

27. The method of claim 23 wherein at least one of the estimators is based on a continuous-time extended Kalman filter (CTEKF) for state estimation and the diagnostic measurements.

28. The method of claim 23 wherein at least one of the estimators is based on a discrete-time extended Kalman filter (DTEKF) for state estimation.

* * * * *